(12) United States Patent
Michelet et al.

(10) Patent No.: US 8,529,168 B2
(45) Date of Patent: Sep. 10, 2013

(54) CUTTING INSERT WITH A WIPER EDGE

(75) Inventors: Benjamin Michelet, Bourges (FR); Bertrand Rivière, Bourges (FR); Catherine Jublot, Saint Doulchard (FR); Francois Auzenat, Bourges (FR)

(73) Assignee: Seco Tools AB, Fagersta (SE)

( * ) Notice: Subject to any disclaimer, the term of this patent is extended or adjusted under 35 U.S.C. 154(b) by 372 days.

(21) Appl. No.: 12/996,024

(22) PCT Filed: Jun. 3, 2009

(86) PCT No.: PCT/SE2009/050652
§ 371 (c)(1),
(2), (4) Date: Jan. 5, 2011

(87) PCT Pub. No.: WO2009/157851
PCT Pub. Date: Dec. 30, 2009

(65) Prior Publication Data
US 2011/0123283 A1    May 26, 2011

(30) Foreign Application Priority Data

Jun. 26, 2008  (SE) ........................ 0801512
Jun. 26, 2008  (SE) ........................ 0801513

(51) Int. Cl.
*B23C 5/20*  (2006.01)
(52) U.S. Cl.
USPC ............................................ 407/113; 407/42
(58) Field of Classification Search
CPC ................................... B23C 5/20; B23C 5/16
USPC ................. 407/114, 115, 116, 113, 34, 42, 407/61
See application file for complete search history.

(56) References Cited

U.S. PATENT DOCUMENTS

| | | | |
|---|---|---|---|
| 5,346,336 A * | 9/1994 | Rescigno | 407/104 |
| 6,508,612 B1 * | 1/2003 | Baca | 407/43 |
| 2003/0002929 A1 * | 1/2003 | Nagashima | 407/40 |
| 2003/0021641 A1 | 1/2003 | Nelson | |
| 2004/0165961 A1 * | 8/2004 | Nagaya et al. | 407/113 |
| 2005/0084342 A1 * | 4/2005 | Festeau et al. | 407/113 |

FOREIGN PATENT DOCUMENTS

| | | | |
|---|---|---|---|
| DE | 19703569 A1 | | 10/1997 |
| DE | 10230452 A1 | * | 1/2004 |
| EP | 0936015 A1 | | 8/1999 |
| EP | 0941796 A2 | | 9/1999 |
| EP | 1872889 A1 | | 1/2008 |
| JP | 04093110 | * | 3/1992 |
| JP | 10263916 | * | 10/1998 |
| JP | 11090723 | * | 4/1999 |
| JP | 2004160620 | * | 6/2004 |
| JP | 2009066677 A | * | 4/2009 |
| WO | 03051566 A1 | | 6/2003 |
| WO | WO2004/062840 A1 | * | 7/2004 |

OTHER PUBLICATIONS

International Search Report for corresponding International Application PCT/SE2009/050652.

* cited by examiner

*Primary Examiner* — Daniel Howell
*Assistant Examiner* — Ryan Rufo
(74) *Attorney, Agent, or Firm* — WRB-IP LLP (57) ABSTRACT

A cutting insert is provided. The cutting insert has a top surface, a side surface, and a bottom surface. An intersection between the top surface and the side surface defines a substantially circular cutting edge. The cutting edge includes at least one wiper edge and the side surface includes at least one wiper surface provided behind the wiper edge.

9 Claims, 10 Drawing Sheets

CUTTING INSERT WITH A WIPER EDGE

The present invention relates generally to cutting inserts and, more particularly, to families of cutting inserts usable in the same toolholders.

In milling cutting operations, use of an insert of circular shape permits providing a depth of cut equal to one half of insert diameter, or generating a radius at the bottom of a workpiece. The leading angle of a milling cutting tool with a circular insert depends on depth of cut. The higher the depth of cut is, the higher the leading angle is. To reach the maximum material removal rate using circular inserts, the conventional strategy is to machine with high depth and avoid reaching a high feed per tooth. This strategy tends to create high radial cutting forces which are acceptable when the tool overhang is short but which create chatter effects when total tool length becomes large.

With a high feed insert, such as an insert having four cutting edges, the maximum depth of cut is reduced due to the insert shape and, consequently, the leading angle is reduced. To reach the maximum material removal rate using a high feed insert, the strategy differs from that used with circular inserts. Because the leading angle and depth of cut is typically reduced in a multi-edge insert relative to a circular insert, the feed per tooth can be increased. This strategy tends to reduce radial cutting forces (at least relative to high depth of cut and/or high leading angle operations), which can be a benefit when long overhang is necessary.

When using a finishing insert, the depth of cut and the leading angle are generally reduced further, and feed rate can be increased further.

When switching from use of one type of insert to another, it is ordinarily necessary to adjust various settings on the CNC machine to account for different lengths and diameters of the cutting tool. It is desirable to provide a milling toolholder on which several different kinds of inserts could be mounted for operations such as copy milling, face milling, plunging, helical interpolation, and the like. It is also desirable to provide inserts that can be mounted on the same toolholder so that, regardless which insert is mounted on the toolholder, the tool will generate the same diameter and have the same length.

According to an aspect of the present invention, a family of cutting inserts comprises a plurality of different inserts, each having a different geometry, wherein each insert of the plurality of different inserts is adapted to be mounted in a common insert-receiving pocket on a toolholder of a milling cutting tool so that an outer diameter generated by the milling cutting tool is the same, regardless which insert of the plurality of inserts is mounted in the pocket.

According to another aspect of the present invention, a family of cutting inserts is provided. Each cutting insert in the family has a bottom supporting surface and an axis of rotation and, arranged around the axis of rotation, a plurality of side insert supporting surfaces and a plurality of cutting edge portions corresponding to each of the plurality of side insert supporting surfaces. The cutting edge portions for each insert being generally convex and the cutting edge portions for at least some different inserts in the family having different curvatures. For each cutting edge, a first plane parallel to the axis of rotation and tangent to the cutting edge at a face contact point on the cutting edge is disposed at a predetermined distance from a parallel second plane extending through the axis of rotation and rotated at a predetermined angle relative to a third plane intersecting a corresponding side insert supporting surface along a line substantially perpendicular to the axis of rotation.

According to another aspect of the present invention, a milling cutting tool arrangement is provided and comprises a toolholder comprising a body and at least one insert-receiving pocket in the body, the at least one insert-receiving pocket being adapted to receive any one of a family of cutting inserts.

According to another aspect of the present invention, a cutting insert is provided, the cutting insert having a top surface, a side surface, and a bottom surface, an intersection between the top surface and the side surface defining a substantially circular cutting edge, the cutting edge comprising at least one wiper edge and the side surface comprising at least one wiper surface provided behind the wiper edge.

BRIEF DESCRIPTION OF THE DRAWINGS

The features and advantages of the present invention are well understood by reading the following detailed description in conjunction with the drawings in which like numerals indicate similar elements and in which:

FIGS. 9A and 9C are bottom plan views of inserts according to aspects of the present invention, while FIG. 9B shows a cross-section according to the line IXB-IXB in FIG. 9A.

DETAILED DESCRIPTION

Figure 1A:
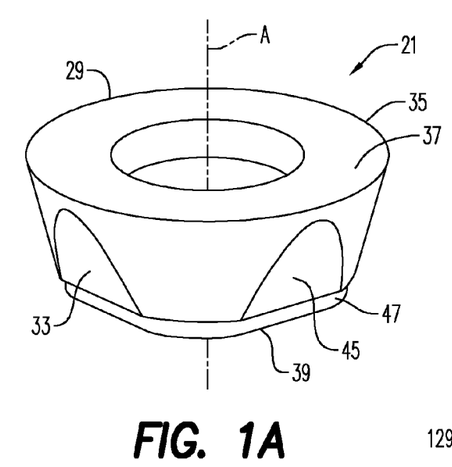
FIGS. 1A, 1B, and 1C are perspective views of inserts according to aspects of the present invention.
Figure 1B:
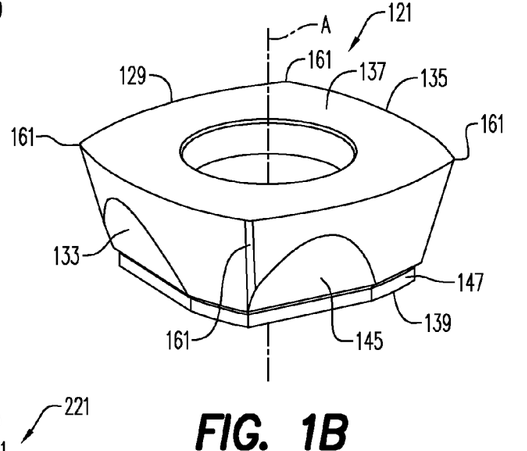
Figure 1C:
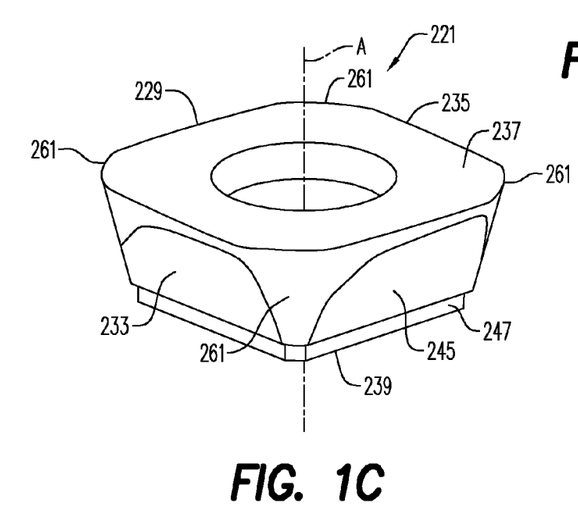

Different inserts 21, 121, 221 of a family of cutting inserts are shown in FIGS. 1A-1C. Each insert 21, 121, 221 has a different geometry, such as, but not necessarily, having cutting edges that are of different shapes when viewed in plan. For illustrative purposes, the insert 21 has a circular shape when viewed in plan, the insert 121 has a four-sided shape when viewed in plan with cutting edges having radii equal to a diameter of a circle inscribed in the corresponding circular insert 21 and with radiused corners between the cutting edges, and the insert 221 has a four-sided shape when viewed in plan with cutting edges having radii greater than the diameter of a circle inscribed in the insert and with a plurality of (three) chamfers between the cutting edges. The differences in geometry can involve other features of the insert, instead of or in addition to the cutting edges, such as the presence or absence of chipbreakers, flat or curved wiper surfaces, etc.

Figure 2:
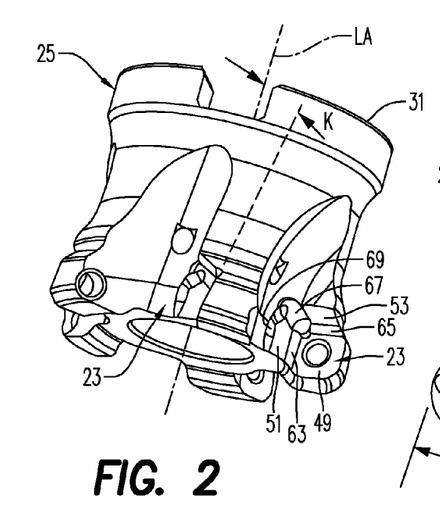
FIG. 2 is a perspective view of a toolholder according to an aspect of the present invention.
Figure 3A:
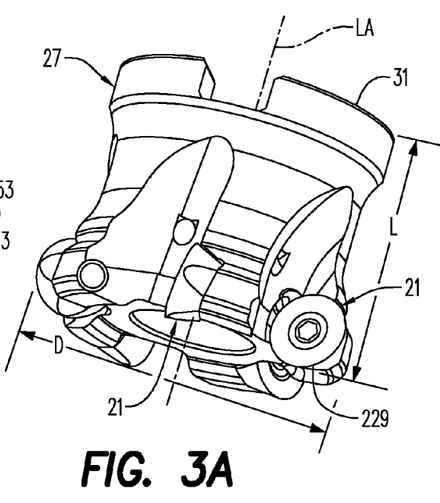
FIGS. 3A, 3B, and 3C are perspective views of milling cutting tools according to aspects of the present invention.
Figure 3B:
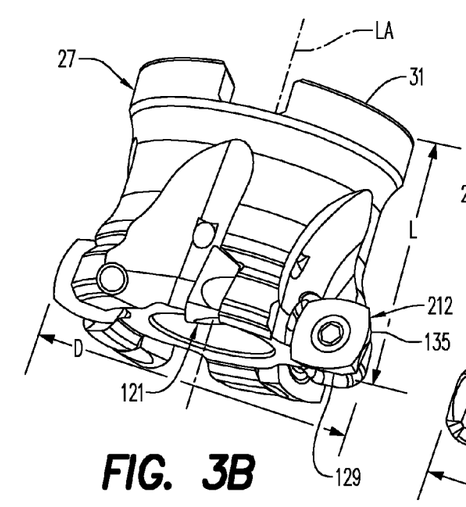
Figure 3C:
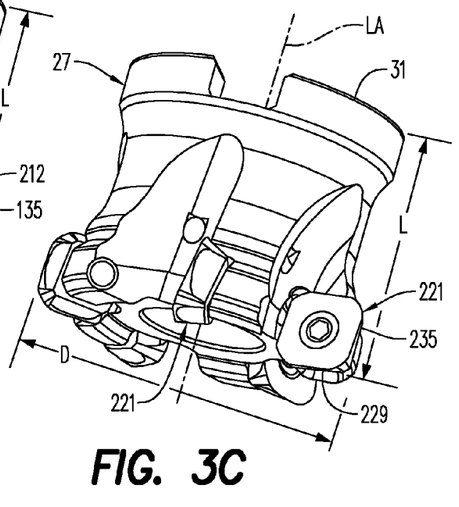

Each insert 21, 121, 221 of the plurality of different inserts is adapted to be mounted in a common insert-receiving pocket 23 on a toolholder 25 as seen in FIG. 2, thereby forming a milling cutting tool 27 as seen in FIGS. 3A-3C. At least one and, ordinarily, a plurality of common pockets 23 are provided on the toolholder 25 for receiving a corresponding plurality of inserts. Ordinarily, as seen in FIGS. 3A-3C, at any given time, only one type of insert of the family of inserts is mounted on the toolholder, i.e., a plurality of inserts 21, a plurality of inserts 121, or a plurality of inserts 221, however, it is also possible to mount different types of the inserts of the family of inserts on a single toolholder, e.g., an insert 21 with an insert 121 and/or 221.

According to an aspect of the invention, the pockets 23 and the inserts 21, 121, 221 are configured such that an outer diameter D generated by a milling cutting tool 27 formed when inserts are mounted in the toolholder can be the same, regardless which of the inserts 21, 121, or 221 in the family are provided in the pockets. An axial length L of the milling cutting tool 27 measured from a forwardmost cutting edge 29, 129, 229 on each insert of the plurality of inserts 21, 121, 221, when mounted in the pocket 23, to a rearwardmost point 31 on the toolholder can be the same regardless which insert of the plurality of inserts is mounted in the pocket.

Figure 4A:
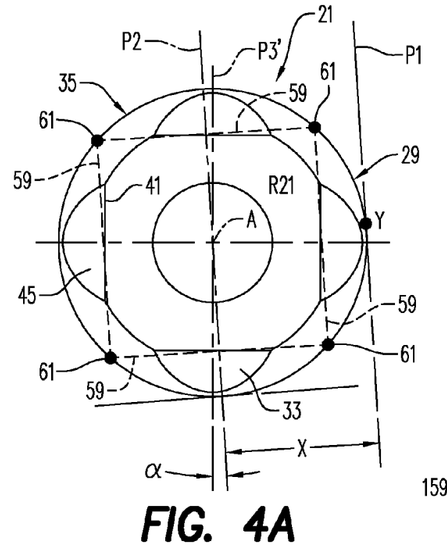
FIGS. 4A, 4B, and 4C are bottom plan views of inserts according to aspects of the present invention.
Figure 4B:
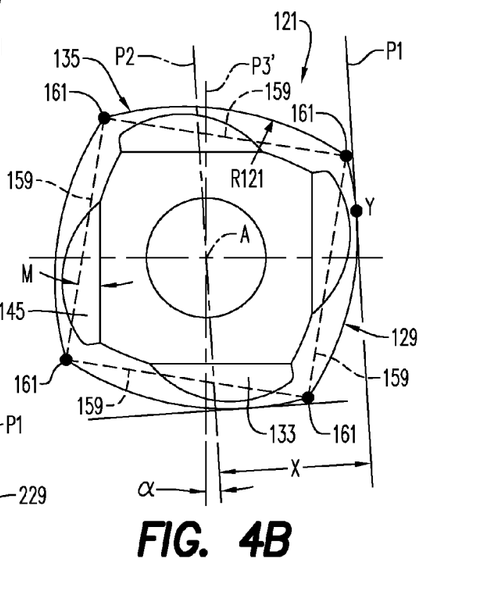
Figure 4C:
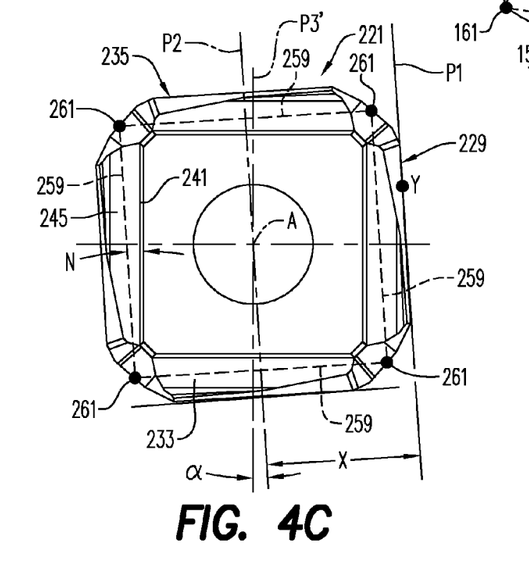

According to an aspect of the invention, to provide a milling cutting tool 27 that generates the same diameter D regardless which of the inserts 21, 121, or 221 is mounted in the pockets of the toolholder 25, as seen for example in FIGS. 4A-4C, each insert of the plurality of different inserts has at least one insert supporting surface 33, 133, 233 having a plane P, and a cutting edge 35, 135, 235 associated with and on a substantially opposite side of the insert from the at least one insert supporting surface. The inserts 21, 121, 221 have a central axis A extending between a top 37, 137, 237 (FIGS. 1A-1C) of the insert and a bottom 39, 139, 239 of the insert. Ordinarily, the insert is indexable to a plurality of different positions about the central axis A to permit using different cutting edges on the insert.

As seen in FIGS. 4A-4C, for a family of cutting inserts 21, 121, 221, each cutting insert has a bottom supporting surface 39, 139, 239 and an axis of rotation A. A plurality of side insert supporting surfaces 33, 45, 133, 145, 233, 245 and a plurality of cutting edge portions 35, 29, 135, 129, 235, 229 corresponding to each of the plurality of side insert supporting surfaces are arranged around the axis of rotation A. The cutting edge portions for each insert 21, 121, 221 are generally convex and the cutting edge portions for different inserts have different curvatures. For each cutting edge portion, a first plane P1 parallel to the axis of rotation A and tangent to the cutting edge at a face contact point Y (or some other, arbitrary or non-arbitrary point) on the cutting edge is disposed at a predetermined distance X from a parallel second plane P2 extending through the axis of rotation and rotated at a predetermined angle α relative to a third plane P3 intersecting a corresponding side insert supporting surface along a line 41, 141, 241 (FIGS. 4A-4C and 10) substantially perpendicular to the axis of rotation A. The line 41, 141, 241 may be, but need not be, a line defining a base of the side insert supporting surface. FIGS. 4A-4C show the angle α measured relative to a plane P3' parallel to plane P3 but offset relative to the plane P3 to extend through the axis of rotation like the plane P2.

In the family of inserts shown in FIGS. 4A-4C, one cutting insert 21 of the family of cutting inserts is substantially circular when viewed along the axis of rotation A. The predetermined distance X for all of the inserts is therefore equal to the radius of the cutting insert 21. If a circular insert is not a member of the family of inserts, the distance X can be substantially any desired value.

Figure 10:
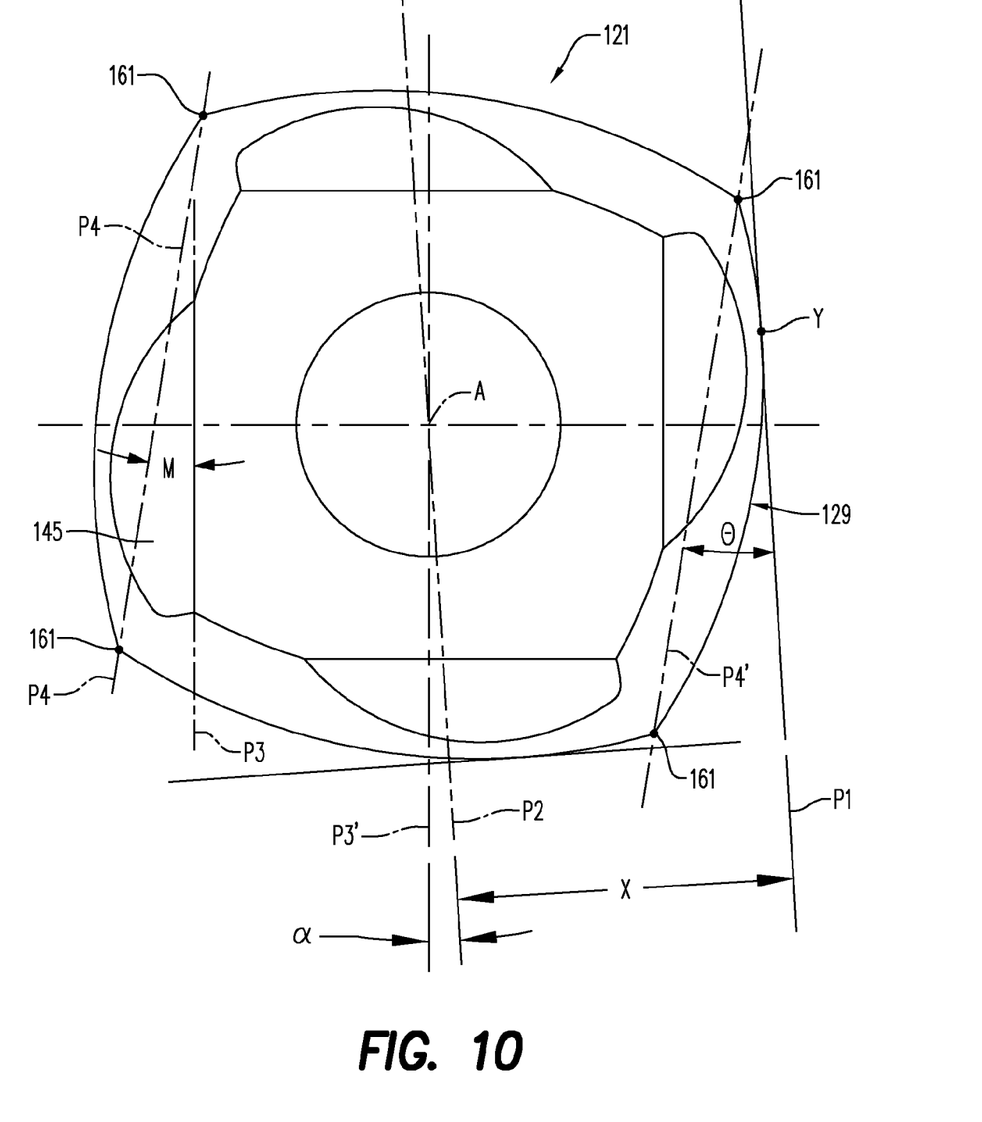
FIG. 10 is a bottom plan view of an insert according to an aspect of the present invention.

The predetermined angle α can be determined for a single insert of the family of inserts and applied to the rest of the members of the family. FIG. 10 shows how the angle α is determined for the insert 121 of the family of inserts 21, 121, 221. The angle α is substantially equal to a difference between an offset angle θ of the cutting insert 121 and an angle of rotation M of the third plane P3 relative to a fourth plane P4 parallel to the axis of rotation and intersecting opposite end points 161 of the cutting edge (edge 129 shown for purposes of illustration) corresponding to the side insert supporting surface (surface 145 shown for purposes of illustration) intersected by the third plane, the angles being considered when the insert is viewed in "plan" along the axis of rotation A of the insert. The offset angle θ is measured between the first plane P1 and a fourth plane P4' parallel to the axis of rotation A and extending between end points 161 of the cutting edge 129 (parallel to plane P4). In other words, the angle α is measured between the plane P1 (parallel to P2) and the plane P3. The angle α is described as being "substantially" equal to the difference between the offset angle θ and the angle of rotation M because it may be desirable to further adjust the angle for purposes of fine tuning, such as if the insert is oriented at a non-zero axial angle, i.e., a plane of the bottom surface 49 of the pocket 23 is not parallel to the axis of rotation LA of the toolholder 25. For example, depending upon the axial angle of the insert in the toolholder 25, it may be desirable to further adjust the angle α, e.g., ± about 1°.

In an embodiment according to an aspect of the invention, a second cutting insert 21 of the family of cutting inserts is substantially circular when viewed along the axis of rotation, and the predetermined distance X is equal to the radius R21 of the cutting insert. The plurality of cutting edges 29, 35 of the first cutting insert 121 have a radius R121 substantially equal to a diameter of the second cutting insert, i.e., 2 times R21. The cutting edges of non-circular inserts do not, however, have to be arcs of circles, i.e., they need not have a particular radius.

The predetermined angle α will ordinarily be between 15° and −15° and, preferably, greater than 0°. The side insert supporting surfaces may be but need not be substantially planar. Where the side insert supporting surfaces are described as having a plane, it will be understood that this can refer to a reference plane associated with the surface and that the surface is not necessarily planar.

To provide a milling cutting tool 27 as shown in FIGS. 3A-3C that has the same axial length L measured from a forwardmost cutting edge 29, 129, 229 on each insert of the plurality of inserts 21, 121, 221, when mounted in the pocket 23, to a rearwardmost point 31 on the toolholder 25, the relationship between the cutting edge 29, 129, 229 and the insert supporting surface 45, 145, 245 on the opposite side of the insert is the same as the relationship between the cutting edge 35, 135, 235 and the insert supporting surface 33, 133, 233 on the opposite side of the insert. The relationship can and ordinarily does apply to any insert supporting surface and the associated cutting edge on the opposite side of the insert from the insert supporting surface so that, regardless how any insert is indexed about the axis A, the milling cutting tool 27 will generate the same diameter D and have the same axial length L.

The inserts 21, 121, 221 as shown in, for example, FIGS. 1A-1C are shown having integrated anvils 47, 147, 247 such as are disclosed in EP 0 458 003 B1, which is incorporated by reference. The height of the integrated anvil 47, 147, 247 is ordinarily about 15% of the total insert 21, 121, 221 thickness. Regardless whether an anvil is provided, each of the inserts 21, 121, 221 can be configured so that a circle inscribed in the inserts and tangent to the lowest point on each insert supporting surface has the same diameter for each insert. This structure can facilitate fitting the different insert shapes into toolholder pockets of the same size.

Figure 5A:
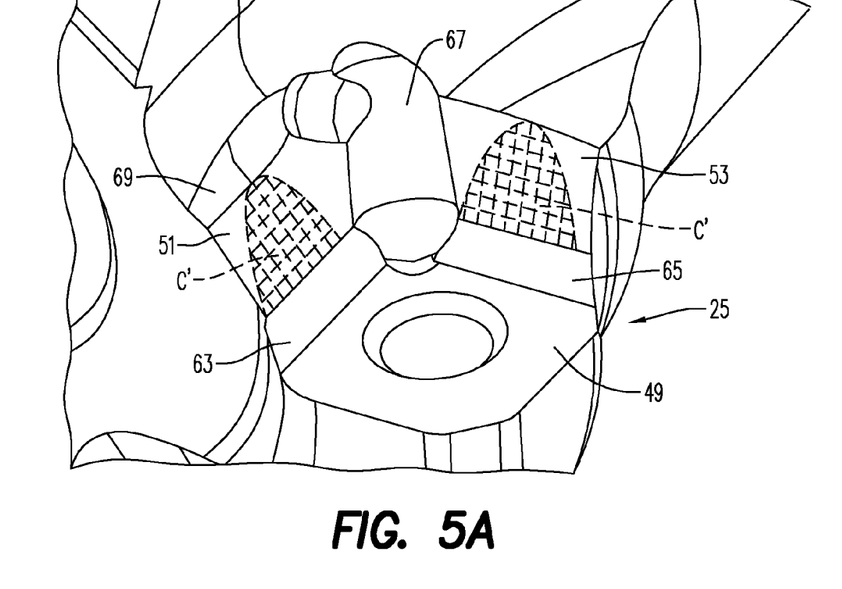
FIGS. 5A, 5B, and 5C are perspective views of pockets in toolholders according to aspects of the present invention.
Figure 5B:
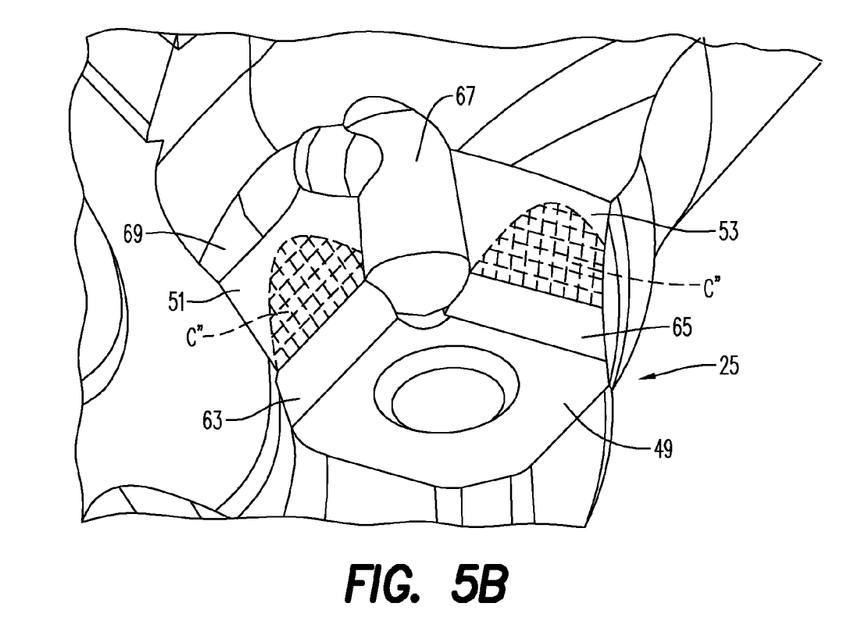
Figure 5C:
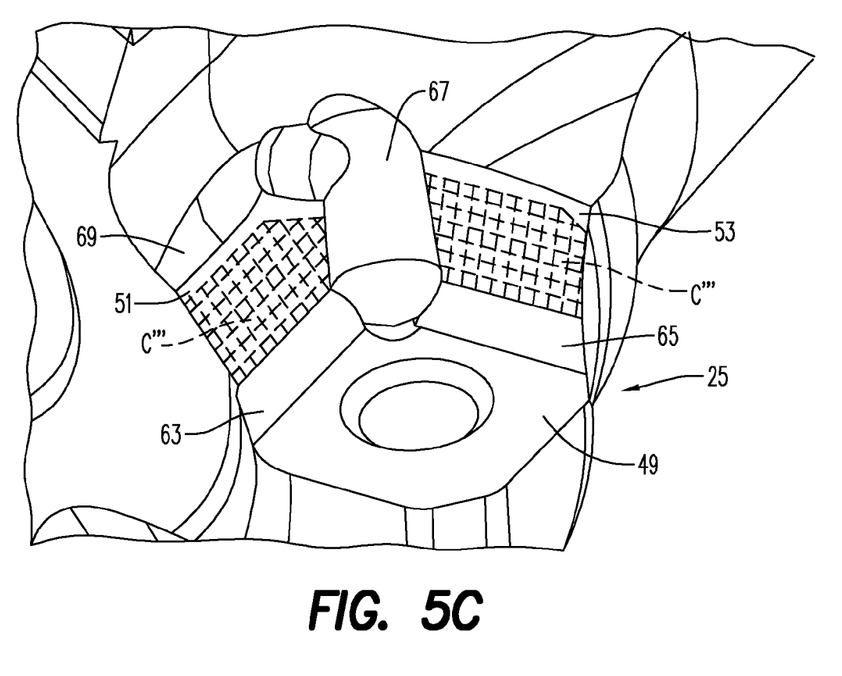

As seen in FIG. 5A-5C, the pocket 23 ordinarily includes a flat bottom surface 49, and flat, generally axially extending and flat, generally radially extending side abutment surfaces 51 and 53. The bottom surface 39, 139, 239 of the insert, and the insert supporting surfaces 33, 133, 233 and 45, 145, 245 are ordinarily, but not necessarily, substantially flat and planar, at least at points where they are intended to abut corresponding abutment surfaces 49, 51, 53 in the pocket 23. When an insert 21, 121, 221 is mounted in a pocket 23 having two abutment surfaces 51 and 53, two successive insert supporting surfaces 33, 133, 233 and 45, 145, 245 will contact the abutment surfaces. The inserts illustrated in the present application are indexable to four different positions to utilize four different cutting edges provided on the insert and it will be appreciated that the identification of the insert supporting surfaces by particular reference numerals is for purposes of discussion only, and that the insert is typically rotationally symmetrical about the central axis A in four different positions oriented at 90° to each other. In other embodiments, the insert can be indexable to some number of different positions other than four, such as two or eight different positions.

Figure 8:
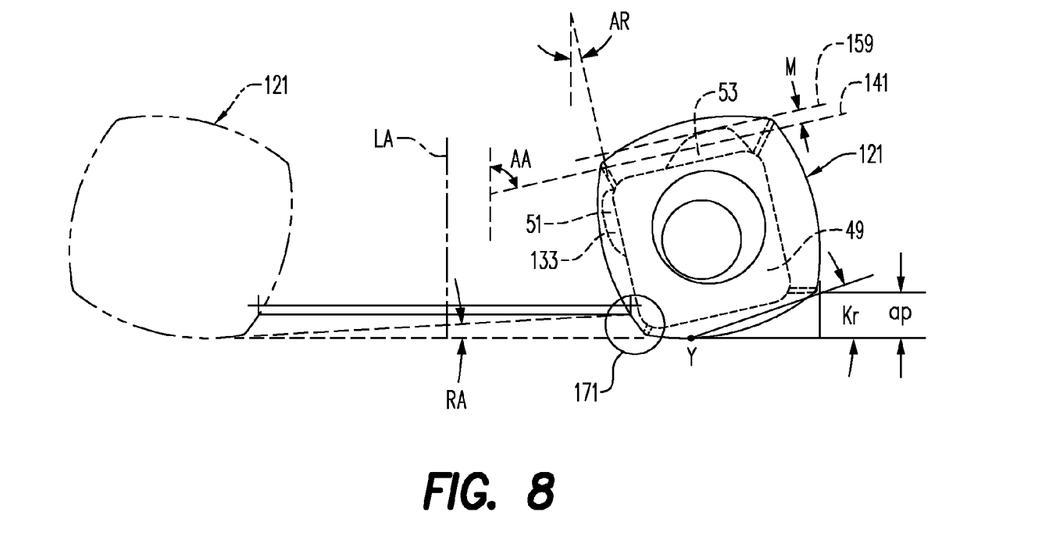
FIG. 8 is a schematic view of parts of a milling cutting tool according to an aspect of the present invention illustrating a ramping angle of the milling cutting tool.

In other embodiments (not shown), the bottom surfaces of the insert and the pocket may be provided with structures such as mating grooved surfaces to facilitate, among other things, seating of the insert with reduced possibility of rotation. In other embodiments, the bottom and insert supporting surfaces of the insert and/or the bottom and abutment surfaces of the pocket may be provided with structures such as recesses to facilitate, among other things, ensuring multi-point contact between the insert surfaces and the corresponding pocket surfaces. The radial and axial abutment surfaces in the pocket need not and ordinarily do not extend only in the radial and axial directions relative to the toolholder. As seen in FIG. 8, for example, the radial abutment surface 51 (shown in phantom) extends at an angle AR to the axis LA of the toolholder 25, the axial abutment surface 53 (shown in phantom) extends at an angle AA to the axis of the toolholder, and the bottom abutment surface 49 (shown in phantom) extends at the angle K (FIG. 2) to the axis of the toolholder.

For purposes of discussion, it will be understood that the radial and axial abutment surfaces 51 and 53 are substantially flat and planar, at least where they abut the insert supporting surfaces, and that the radial and axial abutment surfaces extend only radially and axially relative to the toolholder 25. Likewise, merely for purposes of discussion, it will further be understood that the insert supporting surfaces 33, 133, 233 and 45, 145, and 245 are substantially flat and planar, at least where they abut the insert supporting surfaces, and that they are substantially perpendicular to each other.

The flat surfaces of the abutment surfaces and the insert supporting surfaces act as seating faces and secure the insert against rotation relative to the toolholder during machining operations. The pocket 23 shown in FIG. 5A shows the general area of contact C' on the radial and axial abutment surfaces 51 and 53 of the insert-supporting surface portions 33 and 45 (not shown in FIG. 5A) of the insert 21, the pocket 23 shown in FIG. 5B shows the general area of contact C" on the radial and axial abutment surfaces 51 and 53 of the insert supporting surface portions 133 and 145 (not shown in FIG. 5B) of the insert 121, and the pocket 23 shown in FIG. 5C shows the general area of contact C''' on the radial and axial abutment surfaces 51 and 53 of the insert supporting surfaces portions 233 and 245 (not shown in FIG. 5C). The area of contact is not necessarily the same for each insert in the family of inserts. The area of contact is also not necessarily the same for the abutment of any particular pair of insert supporting surfaces and their associated abutment surfaces, even though FIG. 5A shows each of the areas of contact C' being substantially the same, FIG. 5B shows each of the areas of contact C" being substantially the same, and FIG. 5C shows each of the areas of contact C''' being substantially the same. Ordinarily, as seen in FIGS. 4A-4C and 6A-6C, the insert supporting surfaces 33, 133, 233 and 45, 145, 245 of an insert 21, 121, 221 in the family of inserts will begin at the top of the integrated anvil 47, 147, 247 and finish at some point in the flank face 55, 155, 255 and 57, 157, 257 of the insert, ordinarily below the cutting edge 29, 129, 229 and 35, 135, 235.

Figure 6A:
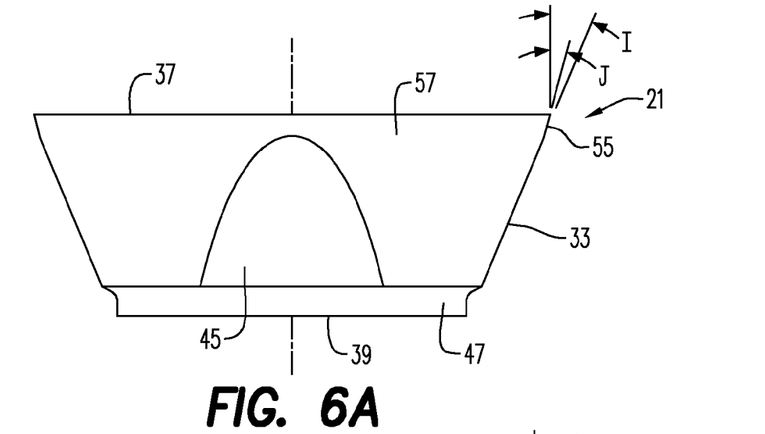
FIGS. 6A, 6B, and 6C are side views of inserts according to aspects of the present invention.
Figure 6B:
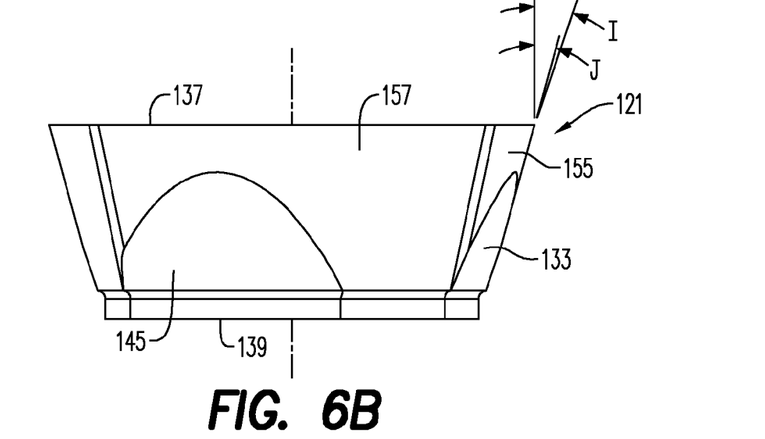
Figure 6C:
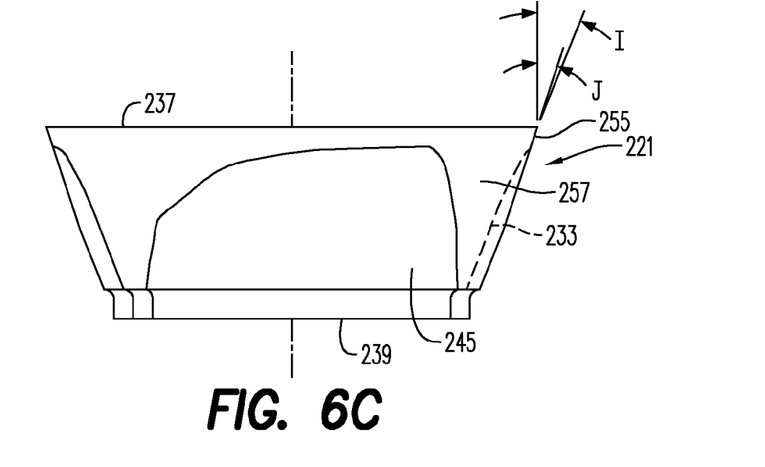

As seen in FIGS. 6A, 6B, and 6C, the flat insert supporting surfaces 33, 133, 233 and 45, 145, 245 will ordinarily define a larger angle with a line parallel to the central axis A than the flank face 55, 155, 255 and 57, 157, 257. In an embodiment, the insert supporting surfaces 33, 133, 233 and 45, 145, 245 define an angle I of 22° with the line parallel to the central axis A and the flank faces 55, 155, 255 and 57, 157, 257 define an angle J of 15° with the line parallel to the central axis A.

In the embodiments of the inserts 21, 121, 221 shown in FIGS. 1A-1C, 3A-3C, and 4A-4C, the inserts have four insert supporting surfaces and four associated cutting edges on opposite sides of the insert from the insert supporting surfaces. Adjacent insert supporting surfaces can be oriented at angles of 90° around the axis of rotation A of the insert. Other embodiments may, of course, have more or fewer insert supporting surfaces and cutting edges.

Figures 7A, 7B, 7C:
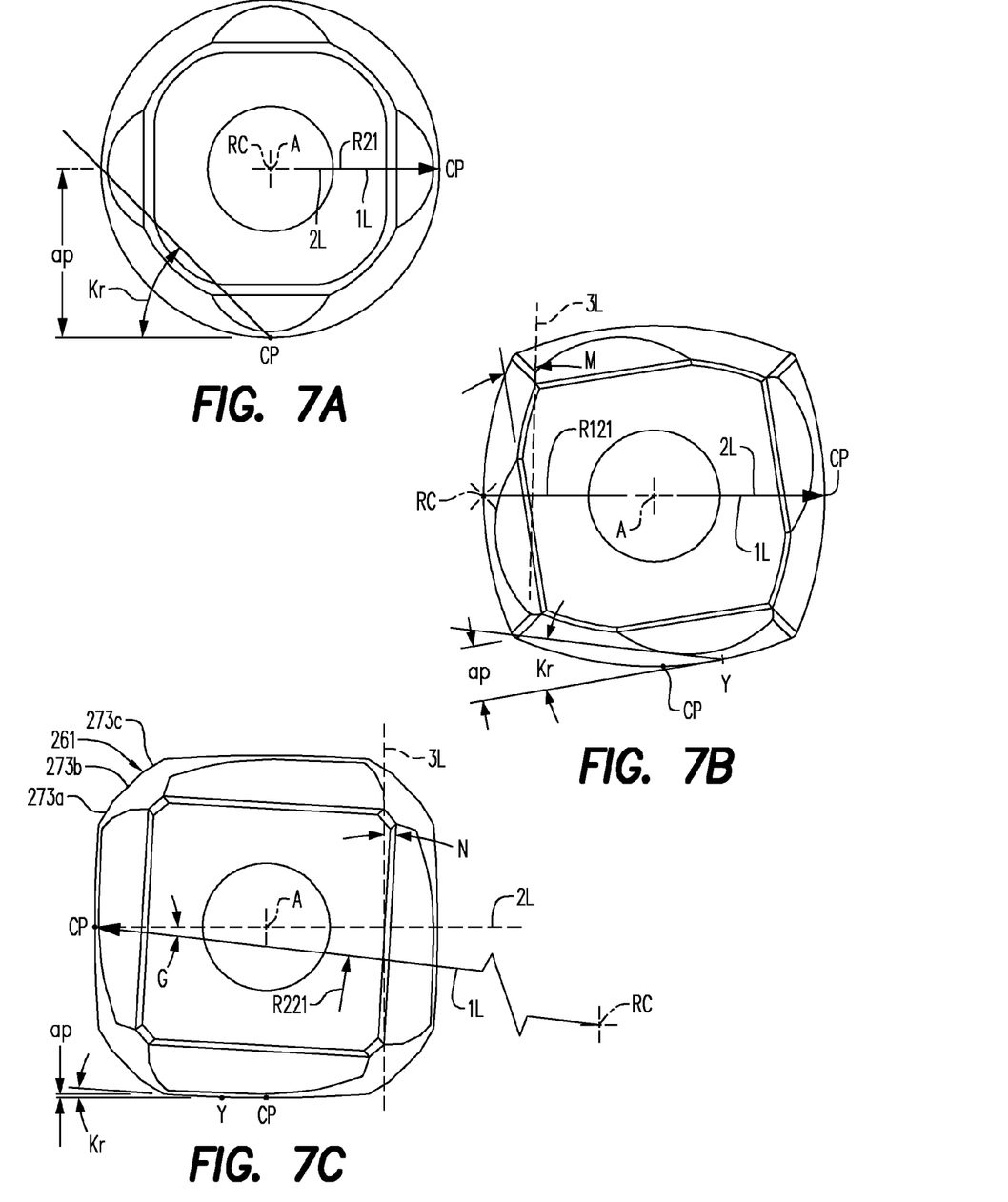
FIGS. 7A, 7B, and 7C are bottom plan views of inserts according to aspects of the present invention.

The height of the insert supporting surfaces 33 and 45 of the insert 21 is about 75% of the total height of the insert. An insert such as the insert 21 is particularly useful in providing a high maximum depth of cut ap, usually with ap=Insert Diameter/2=R21 as seen in FIG. 7A, and it typically has a relatively large setting or leading angle Kr. When the insert 21 is used in an application where it provides a high depth of cut ap, it is typically not used to provide a high feed rate. Using a milling tool 27 provided with circular inserts 21 in a manner to reach maximum material removal rate ordinarily involves a high depth of cut ap, without a high feed rate, and high radial cutting forces. Short tool overhang is preferred in such operations to avoid chatter.

In the embodiment of the high feed insert 121 shown in FIGS. 1B, 3B, and 4B, the insert is four-sided and has insert supporting surfaces 145 and 133 disposed on opposite sides of the insert from cutting edges 129 and 135, respectively. The cutting edges 129 and 135 are arcs of a circle having a radius R121 (FIG. 7B) equal to a diameter of a circle inscribed in the insert 21. The diameter of a circle inscribed in the insert 121 may be smaller than the diameter of the circle inscribed in the insert 21 to facilitate providing inserts that, when mounted on the same toolholder, will generate the same diameters and lengths. There are four insert supporting surfaces and adjacent insert supporting surfaces can form angles of 90°. As seen in FIG. 4B, the insert supporting surfaces 145 and 133 can be "rotated" or "offset" so that the line 141 defines an angle M with a line 159 extending through end points of the cutting edges 129 and 135 at corners 161 of the insert 121.

In an embodiment of the high feed insert 121, the angle M is preferably 9° and could be between 7° and 9° (or some other range, depending upon the configuration of the insert and the toolholder). As seen in FIG. 8, offsetting the insert supporting surfaces facilitates increasing a ramping angle compared to a "centered" insert supporting surface, i.e., one where the angle M is 0°. In particular, the rotation or offset of the insert supporting surfaces 133 and 145 (shown in phantom) can expose more of a ramping cutting edge 171 (shown circled in FIG. 8), thereby facilitating entry into a workpiece with a milling cutting tool (not shown in FIG. 8) that does not have cutting inserts in a center of the tool by means of a larger ramping angle RA between the end of the ramping cutting edge and the tip of the cutting edge of the insert (shown in phantom) when rotated 180° about the longitudinal axis LA of the cutting tool.

The maximum depth of cut ap (FIGS. 7B and 8) of the high feed insert 121 is lower than with the circular insert 21, but the feed per tooth can be increased. By offsetting the insert supporting surfaces 133 and 145, it is possible to increase the maximum depth of cut ap relative to an insert with the insert supporting surfaces centered opposite the cutting edges. The leading angle Kr is decreased compared to an equivalent round shape insert. A milling tool 27 provided with high feed inserts 121 tends to reduce radial cutting forces, which can be a benefit when tool overhang is long.

In the embodiment of the high feed finishing insert 221 shown in FIGS. 1C, 3C, and 4C the insert is four-sided and has insert supporting surfaces 245 and 233 disposed on opposite sides of the insert from cutting edges 229 and 235, respectively. The cutting edges 229 and 235 are arcs of a circle having a radius R221 (FIG. 7C) greater than a diameter of a circle inscribed in the insert 221, e.g., radius=50 mm, or more, e.g., 100 mm, 200 mm, etc.

The radius R221 can be "offset" as seen in FIG. 7C in the sense that each cutting edge can be considered to lie along an arc of a respective circle, and a first line 1L (coinciding with radius R) extending through a centerpoint CP of each cutting edge 229, 235 and a radial center RC of its respective circle forms a non-zero angle G with a second line 2L extending through the centerpoint of each cutting edge and an axial center (of rotation) A of the insert. By way of contrast, the line 1L coincident with the radii R21 and R121 of the inserts and extending through the centerpoint CP of the cutting edges in the inserts 21 and 121 shown in FIGS. 7A and 7B forms a 0° angle with the line 2L extending through the centerpoint of the cutting edges and the central axis A of the inserts.

There are four insert supporting surfaces and adjacent insert supporting surfaces can form angles of 90°. As seen in FIG. 4C, the insert supporting surfaces 245 and 233 can be "rotated" or "offset" so that the line 241 defines an angle N with a line 259 extending through end points of the cutting edges 229 and 235 at corners 261 of the insert 221. As described differently with reference to FIG. 7C, the insert supporting surfaces can be considered to be "rotated" or "offset" in the sense that each insert supporting surface forms a non-zero angle N with a third line 3L perpendicular to the second line 2L. In an embodiment, the angle N is preferably 3.5° and may be between 0.5° and 5° (or some other range, depending upon insert and toolholder configuration), which facilitates decreasing the leading angle for small depth of cut with a large radius cutting edge which tends to be more useful in a finishing operation. The "rotation" of the angle N in the insert 221 and the angle M in the insert 121 can be in the opposite direction relative to the lines 259 and 159, respectively, to achieve desired results, particularly where the radial and axial abutment surfaces 51 and 53 in the pocket 23 form an angle with the axis LA of the toolholder 25 and with a perpendicular to the axis of the toolholder.

Regardless how many cutting edges are provided on an insert, in at least some inserts according to embodiment of the present invention, each cutting edge defines an arc of circle and each insert supporting surface of the second one of the plurality of inserts has a plane P. A radial line 2L bisecting an arc of a circle of the cutting edge can be perpendicular to an insert supporting surface on the same side of the insert, as is the case with the insert 21 shown in FIG. 4A, or non-perpendicular to a insert supporting surface on a same side of the insert, as is the case with the inserts 121 and 221 shown in FIGS. 4B and 4C.

The pocket 23, in addition to having a bottom surface 49, and radial and axial abutment surfaces 51 and 53, will ordinarily have a recess 63 at the intersection of the radial surface and the bottom surface, a recess 65 at the intersection of the axial abutment surface and the bottom surface, and a recess 67 at the intersection of the axial abutment surface and the radial abutment surface. A further recess 69 can be provided behind the radial abutment surface 51. The recesses 63, 65, 67, and 69 can facilitate seating of the inserts in the pocket 23 without interference between corners of the inserts and corners of the pocket.

As seen in FIG. 2, the axial angle K of the insert pocket 23—the angle that the bottom surface 49 of the pocket forms with the longitudinal axis LA of the toolholder 25—can be set at an angle different from zero. The angle K will ordinarily be selected depending upon the angle of the insert flank faces 55, 155, 255 and 57, 157, 257. Where the insert flank faces 55, 155, 255 and 57, 157, 257 form an angle J of 15°, for example, the axial angle K of the insert pocket may be set at, for example, 9°, which can facilitate machining of various materials, particularly "sticky" materials such as titanium, stainless steel, and high temperature alloys.

In the circular insert 21, the "corners" 61 between adjacent cutting edges are ordinarily continuations of the circular edge surface. In the high feed insert 121, the corners 161 between curved cutting edges are typically radiused.

In an embodiment of the finishing insert 221, the corners 261 between curved cutting edges are typically chamfered to form three generally flat chamfer surfaces 273a, 273b, 273c (FIG. 7C) that form different angles with the line 259 through ends of the cutting edges. In an embodiment the surface 273a forms a 30° angle, the surface 273b forms a 45° angle, and the surface 273c forms a 60° angle. These chamfers surfaces 273a, 273b, 273c, coupled with offset insert supporting surfaces and an offset circular arc of the cutting edge, help to increase depth of cut with a low setting angle. For example, if the depth of cut is relatively small, the setting angle may be 30° instead of immediately transitioning to, say, a 45° setting angle.

Figures 9A, 9B, 9C:
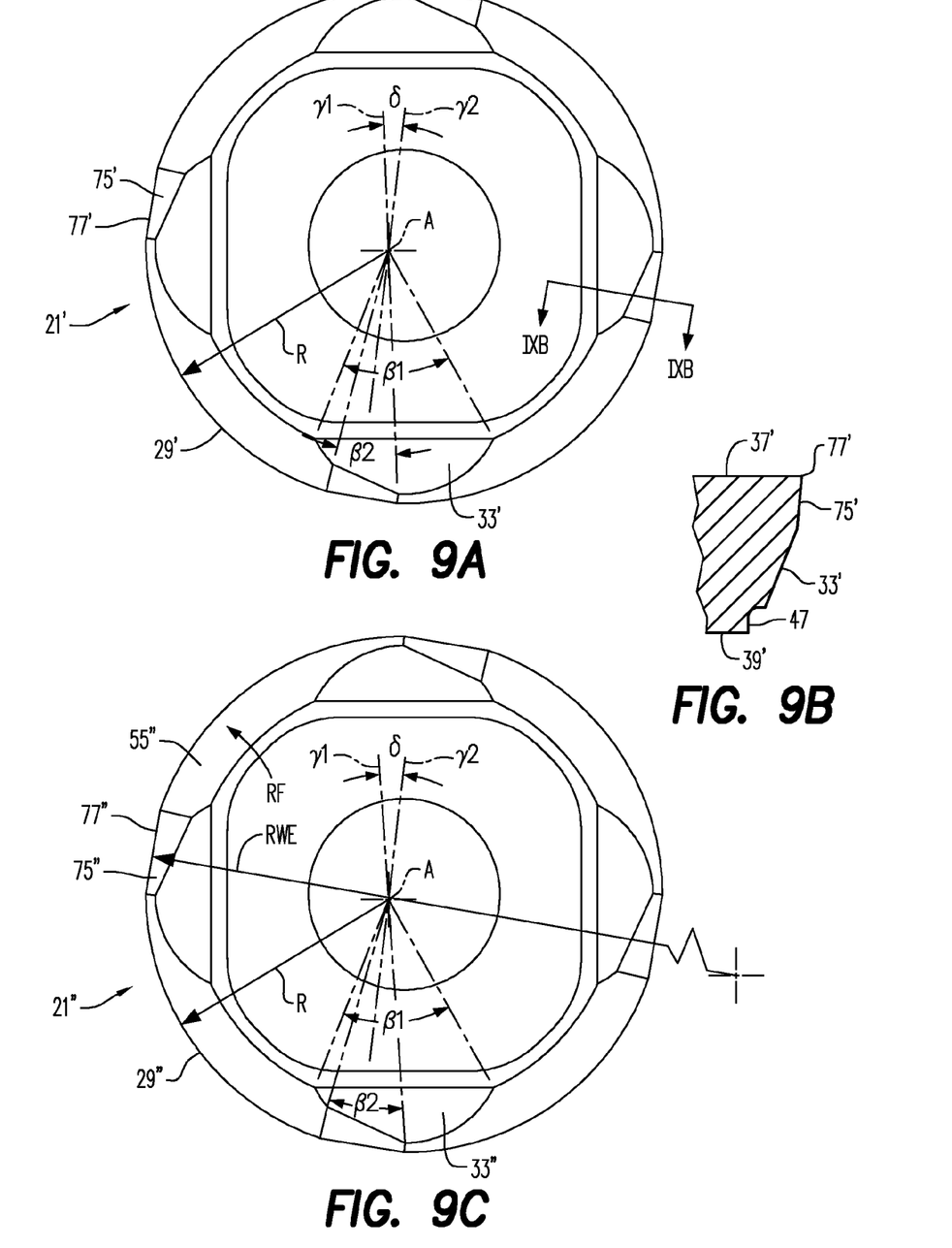

In embodiments of the insert 21, the flank surfaces 55 and 57 between the cutting edges 29 and 35 are portions of a truncated cone. However, as seen in the embodiment 21' shown in FIGS. 9A and 9B, flat wiper surfaces 75' can be provided beneath or behind straight wiper edges 77' along an otherwise circular cutting edge 29' having radius R or, as seen with respect to the embodiment 21" shown in FIG. 9C, curved wiper surfaces 75" can be provided beneath or behind curved wiper edges 77", the wiper edges RWE having a radius different (generally larger) than the radius R of the rest of the cutting edge 29" and having a radius different from a radius of the flank 55" at the same height along the axis A of the insert. The flanks beneath the cutting edges of the inserts 121 and 221 are ordinarily curved portions of truncated cones but, if desired, may have wiper surfaces that are flat or that have radii different from the radii of the flanks. Using inserts with wiper surfaces can produce high quality surface finishes.

The inserts 21' and 21" have one or more insert supporting surfaces 33' and 33" corresponding to a respective wiper surface 75' and 75" and a respective wiper edge 77' and 77". Thus the side surface comprises at least one wiper surface 75', 75" provided behind the wiper edge in the flank wear direction of the insert. Each insert supporting surface 33' and 33" extends through a first angle β1 (not necessarily the same for each insert) measured through the axis of rotation A of the insert, and the respective wiper edge 77' and 77" and respective wiper surface 75' and 75" extends through a second, angle β2 measured through the axis of rotation A of the insert. A centerline γ1 bisecting the first angle β1 forms a non-zero angle δ (not necessarily the same for each insert) with a centerline γ2 bisecting the second angle β2. The insert 21' (and 21") has a top 37' and a bottom 39', FIG. 9B. The angle formed between the top surface and the insert supporting surface 33' is preferably acute and smaller than an acute angle formed between the top surface and the wiper surface 75'. Each respective wiper surface 75' and 75" may intersect an insert supporting surface 33' and 33".

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The disclosures in Swedish patent application Nos. 0801512-5 and 0801513-3, from which this application claim priorities, are incorporated herein by reference.

The invention claimed is:

1. A cutting insert, the cutting insert having a top surface, a side surface, and a bottom surface, an intersection between the top surface and the side surface defining a substantially circular cutting edge, wherein the cutting edge comprises at least one wiper edge and the side surface comprises at least one wiper surface provided behind the wiper edge, wherein the wiper edge has a larger radius than a radius of the cutting edge.

2. The cutting insert as set forth in claim 1, wherein the side surface comprises a truncated conical portion.

3. The cutting insert as set forth in claim 1, wherein the side surface comprises at least one insert supporting surface portion.

4. The cutting insert as set forth in claim 3, wherein the insert supporting surface portion is substantially flat.

5. The cutting insert as set forth in claim 3, wherein there are a plurality of insert supporting surface portions provided in the side surface, each insert supporting surface portion corresponding to a respective wiper edge and a respective wiper surface.

6. The cutting insert as set forth in claim 5, wherein each insert supporting surface extends through a first angle measured through the axis of rotation (A) of the insert, and the respective wiper edge and respective wiper surface extends through a second angle measured through the axis of rotation of the insert.

7. The cutting insert as set forth in claim 6, wherein a centerline bisecting the first angle forms a non-zero angle with a centerline bisecting the second angle (β2).

8. The cutting insert as set forth in claim 1, wherein the wiper surface is substantially flat.

9. The cutting insert as set forth in claim 1, wherein the wiper edge and the wiper surface are radiused.

* * * * *